United States Patent
Yakovenko et al.

(10) Patent No.: US 7,697,097 B2
(45) Date of Patent: *Apr. 13, 2010

(54) LIQUID-CRYSTAL DISPLAY AND METHOD OF ITS FABRICATION

(75) Inventors: Sergey E Yakovenko, Minsk (BY); Victor A Konovalov, Minsk (BY); Anatoly A Muravsky, Minsk (BY); Sergey N Timofeev, Minsk (BY)

(73) Assignee: LG Display Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 11/980,390

(22) Filed: Oct. 31, 2007

(65) Prior Publication Data

US 2008/0062367 A1 Mar. 13, 2008

Related U.S. Application Data (60) Division of application No. 10/854,803, filed on May 27, 2004, now Pat. No. 7,304,704, which is a continuation of application No. 09/529,948, filed as application No. PCT/BY98/00008 on Sep. 25, 1998, now Pat. No. 6,750,933.

(30) Foreign Application Priority Data

Aug. 6, 1998 (BY) .................................. 19980744

(51) Int. Cl.
G02F 1/1337 (2006.01)
(52) U.S. Cl. ...................................... 349/129
(58) Field of Classification Search .......... 349/129–130
See application file for complete search history.

(56) References Cited

U.S. PATENT DOCUMENTS 3,914,022 A 10/1975 Kashnow (Continued)

FOREIGN PATENT DOCUMENTS

EP 0752611 A2 1/1997

(Continued)

OTHER PUBLICATIONS

SID 93 Digest, 19.2 "Two-Domain TN-LCDs Fabricated by Parallel Fringe Field Method," by A. Lien and R.A. John, IBM T.J. Watson Research Center, Yorktown Heights, NY., pp. 269-272.

(Continued)

Primary Examiner—James A Dudek
(74) Attorney, Agent, or Firm—McKenna Long & Aldridge LLP (57) ABSTRACT

The present invention is aimed to make displays with wide viewing angle possessing higher brightness in transmission mode and to develop more simple method for making such displays. This target is achieved by making in display with multiple pixels deflecting elements of dielectric material and depositing them over the electric conductive coating at least on one of the substrates the space between which is occupied by liquid crystal. Dielectric deflecting elements may be displaced along the perimeter of the pix as well as across its area. After applying electric voltage to the electrodes at the opposite substrates at the interface LC-dielectric deflecting dement distortions of the electric field arise with the component of electric field parallel to substrates.

9 Claims, 9 Drawing Sheets

U.S. PATENT DOCUMENTS

| | | | |
|---|---|---|---|
| 4,581,608 A | 4/1986 | Aftergut et al. |
| 4,701,028 A | 10/1987 | Clerc et al. |
| 4,728,175 A | 3/1988 | Baron |
| 4,786,147 A | 11/1988 | Clerc et al. |
| 4,889,412 A | 12/1989 | Clerc et al. |
| 4,937,566 A | 6/1990 | Clerc |
| 4,978,203 A | 12/1990 | Yamazaki et al. |
| 5,039,185 A | 8/1991 | Uchida et al. |
| 5,093,741 A | 3/1992 | Shohara et al. |
| 5,182,664 A | 1/1993 | Clerc |
| 5,229,873 A | 7/1993 | Hirose et al. |
| 5,249,070 A | 9/1993 | Takano |
| 5,309,264 A | 5/1994 | Lien et al. |
| 5,339,181 A | 8/1994 | Kim et al. |
| 5,477,358 A | 12/1995 | Rosenblatt et al. |
| 5,517,341 A | 5/1996 | Kim et al. |
| 5,517,342 A | 5/1996 | Kim et al. |
| 5,574,582 A | 11/1996 | Takeda et al. |
| 5,602,662 A | 2/1997 | Rosenblatt et al. |
| 5,608,556 A | 3/1997 | Koma |
| 5,621,558 A | 4/1997 | Shimada et al. |
| 5,623,354 A | 4/1997 | Lien et al. |
| 5,666,179 A | 9/1997 | Koma |
| 5,668,650 A | 9/1997 | Mori et al. |
| 5,668,651 A | 9/1997 | Yamada et al. |
| 5,673,092 A | 9/1997 | Horie et al. |
| 5,686,977 A | 11/1997 | Kim et al. |
| 5,737,051 A | 4/1998 | Kondo et al. |
| 5,767,926 A | 6/1998 | Kim et al. |
| 5,771,084 A | 6/1998 | Fujimori et al. |
| 5,777,701 A | 7/1998 | Zhang |
| 5,777,711 A | 7/1998 | Sugiyama |
| 5,953,093 A | 9/1999 | Hirata et al. |
| 6,195,147 B1 | 2/2001 | Asao et al. |

FOREIGN PATENT DOCUMENTS

| | | | |
|---|---|---|---|
| EP | 0814142 A2 | 12/1997 |
| EP | 0854377 A2 | 7/1998 |
| EP | 0884626 A2 | 12/1998 |
| GB | 2296810 A | 7/1996 |
| GB | 2321718 A | 8/1998 |
| GB | 2337843 A | 12/1999 |
| JP | 02-294622 | 12/1990 |
| JP | 03-261914 | 11/1991 |
| JP | 04-067127 | 3/1992 |
| JP | 04-261522 | 9/1992 |
| JP | 05-002161 | 1/1993 |
| JP | 05-297412 | 11/1993 |
| JP | 06-194656 | 7/1994 |
| JP | 06-194657 | 7/1994 |
| JP | 06-258649 | 9/1994 |
| JP | 06-273798 | 9/1994 |
| JP | 06-281959 | 10/1994 |
| JP | 06-301036 | 10/1994 |
| JP | 06-347824 | 12/1994 |
| JP | 07-013164 | 1/1995 |
| JP | 07-013166 | 1/1995 |
| JP | 07-028063 | 1/1995 |
| JP | 07-036044 | 2/1995 |
| JP | 07-043698 | 2/1995 |
| JP | 07-043719 | 2/1995 |
| JP | 07-064089 | 3/1995 |
| JP | 07-181493 | 7/1995 |
| JP | 07-199190 | 8/1995 |
| JP | 07-230097 | 8/1995 |
| JP | 07-311383 | 11/1995 |
| JP | 08-022023 | 1/1996 |
| JP | 08-076125 | 3/1996 |
| JP | 08-101399 | 4/1996 |
| JP | 08-146468 | 6/1996 |
| JP | 08-220511 | 8/1996 |
| JP | 08-220524 | 8/1996 |
| JP | 08-313915 | 11/1996 |
| JP | 09-022025 | 1/1997 |
| JP | 09-033890 | 2/1997 |
| JP | 09-152583 | 6/1997 |
| JP | 09-197420 | 7/1997 |
| JP | 09-230360 | 9/1997 |
| JP | 09-230387 | 9/1997 |
| JP | 09-236821 | 9/1997 |
| JP | 09-325373 | 12/1997 |
| JP | 10-301112 | 11/1998 |
| JP | 10-333180 | 12/1998 |
| JP | 11-109355 | 4/1999 |
| JP | 11-109356 | 4/1999 |
| JP | 11-109358 | 4/1999 |
| JP | 11-109362 | 4/1999 |
| JP | 11-109391 | 4/1999 |
| JP | 11-119198 | 4/1999 |
| JP | 11-119209 | 4/1999 |
| JP | 11-148078 | 6/1999 |
| JP | 11-149076 | 6/1999 |
| JP | 11-149079 | 6/1999 |
| JP | 11-149093 | 6/1999 |
| JP | 11-223807 | 8/1999 |
| JP | 11-223808 | 8/1999 |

OTHER PUBLICATIONS

SID 94 Digest, P45: "TFT-Addressed Two-Domain TN VGA Displays Fabricated Using the Parallel-Fringe-Field Method," by A. Lien, R.A. John, IBM T.J. Watson Research Center, Yorktown Heights NY, pp. 594-597.

SID 95 Digest, 41.2 "No-Rub Multi-Domain TFT-LCD Using Surrounding-Electrode Method," by N. Koma, Y. Baba and K. Matsuoka, Sanyo Electric Co., Ltd., Gifu, Japan, pp. 869-872.

Euro Display '96, 11.3 "Novel High Contrast Random and Controlled 4-domain CTN-LCDs with Wide Viewing Angle," by H. Murai, M. Suzuki and S. Kaneko, NEC Corp., Kawasaki, Japan, pp. 159-161.

IDW '97, "A Vertically Aligned LCD Providing Super-High Image Quality," by Y. Koike, S. Kataoka, T. Sasaki, H. Chida, H. Tsuda, A. Takeda and K. Ohmuro, Fujitsu Limited, pp. 159-162.

SID 97 Digest, P-1 "Development of a High-Quality TFT-LCD for Projection Displays," N. Koma and R. Nishikawa, Sanyo Electric Co., Ltd., Gifu, Japan, pp. 461-464.

SID 97 Digest, 33.3 "Development of Super-High-Image-Quality Vertical-Alignment-Mode LCD," by K. Ohmuro, S. Kataoka, T. Sasaki and Y. Koike, Fujitsu Ltd., Atsugi, Japan, pp. 845-848.

SID 97 Digest, 24.1 "Invited Paper: Optical Patterning of Multidomain LCDs," M. Schadt and H. Seiberle, Rolic Ltd., Basel, Switzerland, pp. 397-400.

Japan Display, P2-10 "Wide Viewing Angle LCD Using Retardation Films," N. Yamagishi, H. Watanabe and K. Yokoyama, Matsushita Electric Industrial Co. Ltd., Osaka, pp. 316-319.

SID 98 Digest, 41.3 "New LCD Modes for Wide-Viewing Angle Applications," K.-H. Kim, S.-B. Park, J.-U. Shim and J. -H. Souk, Samsung Electronics, Kyungki-Do, Korea, J.Chen, Liquid Crystal Institute, Kent State University, Kent, OH, pp. 1085-1088.

SID 98 Digest, 41.1 "A Super-High-Image-Quality Multi-Domain Vertical Alignment LCD by New Rubbing-Less Technology," A. Takeda, S. Kataoka, T. Sasaki, H. Chida, H. Tsuda, K. Ohmuro and Y. Koike, Fujitsu Ltd., Atugi, Japan, T. Sasabayashi and K. Okamotoa Fujitsu, Ltd., Kawasaki, Japan, pp. 1077-1080.

Asia Display 95, S30-2 "Development of Super-TFT-LCDs with In-Plane Switching Display Mode," M. Ohta, M. Oh-e and K. Kondo, Electron Tube & Devices Div., Hitachi, Ltd., Mobara, Japan, Hitachi Res. Lab., Hitachi, Ltd., Hitachi, Japan, pp. 707-710.

SID 96 Digest, 32.1 High-Brightness Projection Displays Using Mixed-Mode Twisted-Nematic Liquid-Crystal Cells, S.-T. Wu and C.-S. Wu, Hughes Research Laboratories, Malibu, CA pp. 763-766.

SID 98 Digest, 44.1 "Ridge and Fringe-Field Multi-Domain Homeotropic LCD," A. Lien, R. Nunes, R. A. John, E. Galligan, E. Colgan and J. Wilson, IBM T. J. Watson Research Center, Yorktown Heights, NY, C. Cai, Polytechnic University, Brooklyn, NY, pp. 1123-1126.

SID 98 Digest, 44.2L "Multi-Domain Vertically Aligned Mode," V. A. Konovalov, A. A. Muravski, C. N. Timofeev and S. Ye Yakovenko, Institute of Applied Physics Problems, Minsk, Belarus, pp. 1127-1130.

LIQUID-CRYSTAL DISPLAY AND METHOD OF ITS FABRICATION

This application is a Divisional of prior application Ser. No. 10/854,803, filed May 27, 2004 now U.S. Pat. No. 7,304,704, which is a continuation of prior application Ser. No. 09/529,948, filed Apr. 21, 2000, now U.S. Pat. No. 6,750,933 which is a 371 of PCT/BY98/00008, filed Sep. 25, 1998 which claims the benefit of Belarus Patent Application No. 1998-0744 filed on Aug. 6, 1998, and which are hereby incorporated by reference in its entirety as if fully set forth herein.

FIELD OF THE INVENTION

Invention is related to the field of electronics and can be used for making information displays, in particular, liquid crystal (LC) indicators, screens, panels etc.

PRIOR ART

The drawback of the majority of liquid crystal displays is a strong dependence of their transmission on the angle of light incidence [S. T. Wu, C. S. Wu, SID Digest 27, 763 (1996)-1] and, as a result, decrease of contrast and even inversion of transmission levels at some observation angles. For improving these characteristics of displays in many cases a set of retardation plates is used [N. Yamagishi, H. Watanabe, K. Yokoyama, 'Japan Display 89', 316 (1989)-2], which increases the cost of the device and does not resolve the problem of color inversion.

The most promising from this point of view are multi-domain LC displays, in which a single pixel contains areas with various orientations of the liquid crystal in the plane of substrates [M. Schadt, Proc. SID '97, 24.1 (1997)-3].

There is an information display [K-H. Kim, S.-B. Park, J.-U. Shim, J-H. Souk, J. Chen, SID 98 DIGEST, 1085 (1998)-4], which consists of two plane and parallel substrates with electrodes deposited at least on one of them, the said substrates are overlaid with the electrodes facing each other. The space between the substrates is filled with a homeotropically aligned liquid crystal mixture possessing positive anisotropy. From the outside the substrates are surrounded by two crossed polaroids. In the off state this display does not transmit the light. After electric voltage of the opposite polarity is applied to the neighboring electrodes at one of the substrates, a parabolic electric field is created between the said electrodes, which reorients the liquid crystal parallel to it. In this way it is possible to orient LC molecules between the electrodes in two different directions (the so-called two-domain structure) and as the result, the viewing angle of such display is improved considerably. To maximize the brightness polaroids are oriented at 45° to the electrodes. Nevertheless, low brightness is the drawback of this display, as well as of other displays based on director re-switching in the plane of the substrates [M. Ohta et al, Asia Display '95, 707 (1995)-5]. Another drawback is that it is impossible to have more than two domains in a pixel.

There is display [S.-C. A. Lien, R. A. John, Patent USA, U.S. Pat. No. 5,309,264-6], [S.-C. A. Lien, R. A. John, et. al, SID 98 DIGEST, 1123 (1998)-7], in which two principles are used to have domain structure: fringe field, which arises at the edge of the electrode after applying electric field, and ridge field at the opposite slopes of the protrusions formed lithographically at the opposite substrates with color filters. Protrusions act as elements which incline LC director from the normal to the substrate. The space between the substrates is filled with homeotropically aligned liquid crystal possessing negative dielectric anisotropy. Liquid crystal molecules are aligned perpendicularly to the substrates surface and in the off state this display does not transmit the light (crossed polaroids) and only on the slopes of protrusions the molecules deviate from the normal to the angle which equals the angle between the slope of the protrusion and the substrate. At the slopes the molecules are pre-tilted in different directions, but pre-tilt is not high and therefore it does not perturb optical parameters of display in the off state. Within the pixel protrusions are oriented so that the pre-tilt direction coincides with the direction of the fringe field which arises at the long edge of the pixel (the pixel has elongated rectangular shape). In such display co-action of the fringe electric field and protrusions result in reorienting LC molecules within the pixel in different directions relative to the long axes of the protrusions. The drawback of such device is that although it is possible to have four domains within a pixel (this number of domains is optimal for equalizing optical characteristics in different directions), but in a real display these domains have different area and it is difficult to equalize optical characteristics completely. Besides this, the fringe field which arises around the pixel after applying electric voltage is distorted by connecting buses and this results in non-uniform switching of various domains within a pixel.

The closest to the proposed devices and method is technical reference [A. Takeda et al, SID 98 DIGEST, 1077 (1998)-8]. This display consists of two substrates with the pattern of electrodes deposited on them, on the said electrodes protrusions are deposited photolithographically with the slopes in different directions. These protrusions like similar elements in [7] tilt the LC director from the normal of the substrate. The space between the substrates if filled with homeotropically aligned liquid crystal possessing negative dielectric anisotropy. In the off state the LC molecules are orthogonal to the substrates except those in the areas where the protrusions are displaced. At the slopes of the protrusions the molecules are pre-tilted to the angle, which equals the angle between the slope and the substrate. This pre-tilt is not high and does not perturb optical characteristics of the display in the off state and in crossed polaroids display does not transmit the light. When the voltage is applied to the electrodes at the opposite substrates this pre-tilt is sufficient to initiate molecular reorientation in different directions within the pixel area. This leads to appearing domains and makes viewing angle more uniform. The drawback of this display is low brightness (30% of conventional single-domain display) because of two factors: protrusions occupy more than 30% of the display area and to realize four domains very specific pattern of the protrusions is required, which leads to additional losses of light. Besides this to make this display two additional photolithographies are required.

SUMMARY OF THE INVENTION

Present invention is aimed to make displays with wide viewing angle possessing higher brightness in transmission mode and to develop more simple method for making such displays.

This target is achieved by making in display with multiple pixels deflecting elements of dielectric material and depositing them over the electric conductive coating at least on one of the substrates the space between which is occupied by liquid crystal. Dielectric elements can have profile as from the liquid crystal side, so from the side of the substrate. They can be deposited on both, as well as only on one substrate. Dielectric deflecting elements may be displaced along the perimeter of the pixel as well as across its area. After applying electric voltage to the electrodes at the opposite substrates at the interface LC-dielectric deflecting element distortions of the electric field appear with the component of electric field parallel to the substrates. Direction of this in-plane component is determined by the configuration of the dielectric deflecting elements. The value of this component is sufficient to reorient liquid crystal in different directions and hence to generate different domains within the pixel area and to make optical properties of display independent of the viewing angle. Unlike in the known display [8], dielectric elements take not more than 5-10% of the pixel area and proposed display has higher brightness. At the same time configuration of the dielectric elements is capable of obtaining two—as well as four domain displays for any real pixel shape.

DETAILED DESCRIPTION OF THE PREFERABLE EMBODIMENTS

The proposed displays are fabricated as following.

On one or both substrates with aligning layer deposited on them dielectric deflecting elements are patterned on the top of the last electric conductive layer. Resistivity of the deflecting elements should not be substantially lower than that of the liquid crystal material the last is usually higher than $10^8$ Ohm/cm.

Deflecting elements are usually formed photolithographically. Most often they have shape of solid or dashed lines with the intervals between the dashes 5-30 µm the line-width 2-3 µm and larger and the height (or depth) from 0.1 µm up to the LC thickness. The cross section of the deflecting dielectric elements may have the shape of any geometric figure, such as triangle, turned with one side to the substrate, trapezium, rectangle, semicircle e.t.c. Deflecting dielectric elements are patterned to have the form of lines of any type surrounding the pixel. If pixel has elongated shape, it may be subdivided by deflecting elements into squares, or rectangles with the shape close to squares. Deflecting elements may be displaced in the gap between the electrodes and cover part of the electrode with the width comparable to the height of the element in order to avoid the influence of the fringe field on the LC orientation. The area between the deflecting elements may be filled with supplementary coatings (variants with the deflecting dielectric elements profiled from the side of the substrate). Supplementary coatings may play the role of planarizing film, or color filters matrix, or various conductive layers. This may be the areas of the substrate, between which the wells are made, which are filled with the deflecting dielectric elements.

At the second substrate deflecting elements are also deposited to have a shape of squares, or rectangles with the shape close to squares with the same dimensions as on the first substrate, or with different dimensions, or having shape of solid, or dashed lines of various form.

In the case when matrix of color filters is formed at the second substrate, deflecting dielectric elements usually align with the black matrix, or replace them by dielectric black matrix. In the latter case one technological operation is reduced.

Deflecting dielectric elements on different substrates can be made of different materials. For example, when on the color filter substrate deflecting dielectric elements are replaced by the black matrix, on the second substrate they are made from as transparent material as possible to reduce the losses of light. The height of the deflecting dielectric elements may vary across the substrate and may be different on different substrates. The first case can be useful to make displays with variable viewing angle across the display area.

At the next stage aligning layer for homeotropic or planar alignment is deposited at the substrates.

To control the gap between the substrates in the case when deflecting elements are deposited only on one substrate conventional spacers, such as spheres, or fibers, or particles of definite dimensions made of inorganic as well as organic materials are used. In the case when deflecting elements are deposited on the electrodes on both substrates and have profile from the side turned to the liquid crystal, additional spacers are not necessary because deflecting dielectric elements play the role of spacers. Simultaneously, the display becomes more rugged and the LC layer thickness can be easily varied during fabrication process.

At the next stage of fabricating display with deflecting dielectric elements deposited on one substrate this substrate is overlaid with another one, containing pattern of electrodes, aligning layer and conventional spacers with the said electrodes faced to each other on both substrates and is sealed along the perimeter.

In the case the display has deflecting dielectric elements on both substrates with the profile from the liquid crystal side to obtain equally good viewing characteristics for all observation angles these deflecting elements are aligned so that the crossings of the lines on one substrate be as close as possible to the centers of the squares formed by deflecting dielectric elements on the second substrate. After this display is sealed.

If at least on one of the substrates deflecting dielectric elements are profiles from the side of the substrate, then the substrates are aligned similarly to the previous case, but conventional spacers are used to control the gap between the substrates.

As a rule, liquid crystal domains are formed of equal size to make viewing characteristics independent of angle. Nevertheless, they can have different size if display should have specific viewing characteristics.

The space between the substrates is filled with liquid crystal.

This liquid crystal can possess either positive or negative dielectric anisotropy. Consequently, the said liquid crystal may have either planar of homeotropic alignment. Planar aligning material is rubbed. The angle between the rubbing direction and the deflecting dielectric elements may be taken in the range 0°-180°. Both non-chiral and chiral liquid crystal materials are appropriate. In the case it is chiral and has planar alignment it may be twisted to the angle from 0° to 360°. If it has homeotropic alignment, its twist angle should be chosen so that d/p<0.5 (here d—LC layer thickness, p—its spontaneous helix pitch).

In the proposed displays liquid crystal doped with a dichroic dye can be used and then such display may operate without polaroids and information is displayed due to light absorption by the dye molecules. The dichroic ratio of the dye can be larger or smaller than 1 and liquid crystal may be chiral or non-chiral.

Proposed displays can operate in reflective mode. In such a case one of the substrates and the electrode deposited on it are made non-transparent (reflective). The image is obtained with one polaroid.

Figure 1:
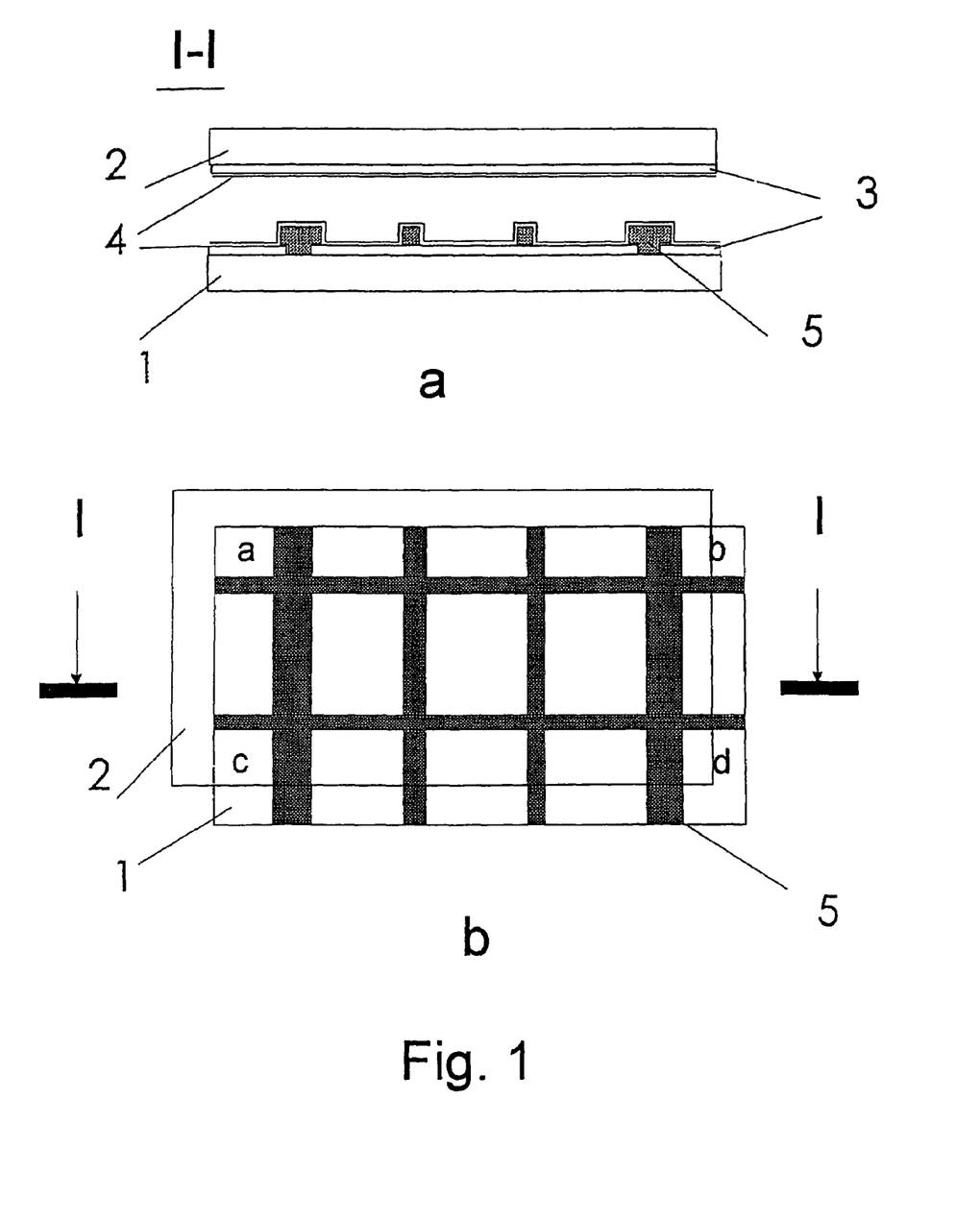
FIGS. 1-2 show the cross-section (a) and the top view (b) of the proposed display, fabricated according to the proposed method with various displacement of the dielectric deflecting elements.

FIG. 1 shows the cross-section (a) and the top view (b) of the proposed display, fabricated according to the proposed method. On two plane glass substrates 1 and 2 0.5-2 mm thick and with linear dimensions on the range of 1 cm to several decimeters transparent electrodes from conductive coating 3 having thickness 70-150 nm and surface resistivity 10-2000 Ohm/□ are deposited in vacuum from the oxide of the indium-tin alloy. The desirable electrode pattern is made photolithographically. On one substrate deflecting dielectric elements 5 are formed from photoresistive dielectric material for example AR P-310, which have the shape of crossing lines with the pitch 100 μm width 5-7 μm and height 2.5-3 μm. Both substrates 1, 2 are covered with homeotropic aligning layer 4, for example AL-655 (JSR), 20-100 nm thick. Conventional spacers, like plastic spheres 3-6 μm in diameter, are deposited on one of the substrates 1, 2. The substrates 1, 2 are overlaid with the aligning layers 4 faced to each other and fixed together with the sealing material having epoxy base, for example UHU plus endfest 300. The space between the substrates 1, 2 is filled with liquid crystal possessing negative dielectric anisotropy, such as MLC-6608. So made display transmits 45-50% of light in the on state in crossed polaroids (for 100% we take the light transmitted by display in the off state between the parallel polaroids).

Figure 2:
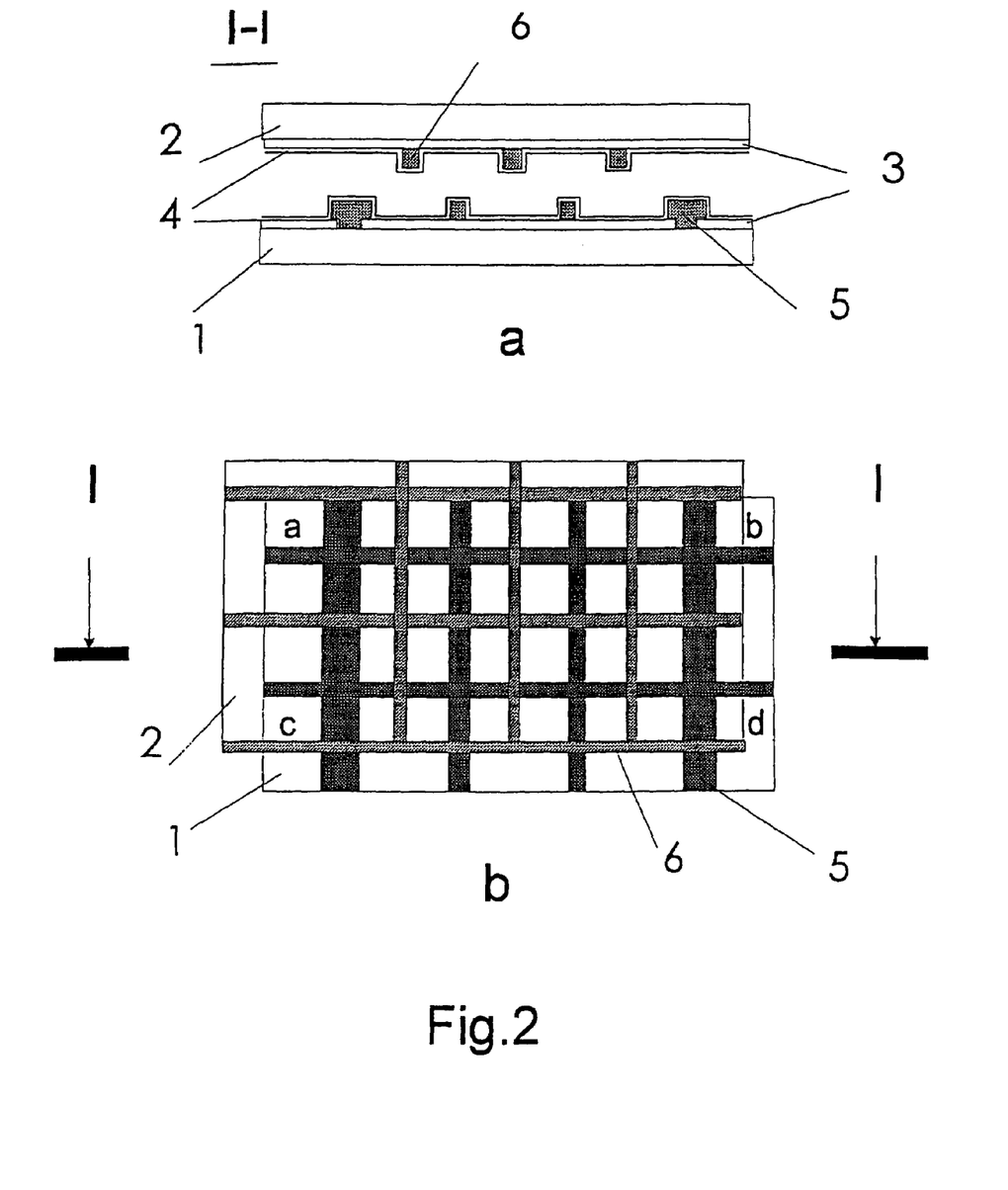

FIG. 2 shows the cross-section (a) and the top view (b) of the proposed display, fabricated according to the proposed method. On two plane glass substrates 1 and 2 on the top of the conductive layer 3 deflecting dielectric elements (5), (6) are deposited in the form of crossing lines with the width 5-6 μm their height is 2.0-2.5 μm and the pitch −100 μm. The substrates 1, 2 are aligned so, that line crossings on one substrate are close to the centers of the squares formed by the lines on the second substrate. The crossings of the lines on different substrates are used as spacers. Single pixel abcd is surrounded by thicker vertical lines and two horizontal lines placed at the bottom substrate 1. So made display transmits 75-80% of light in the on state in crossed polaroids.

Figure 3:
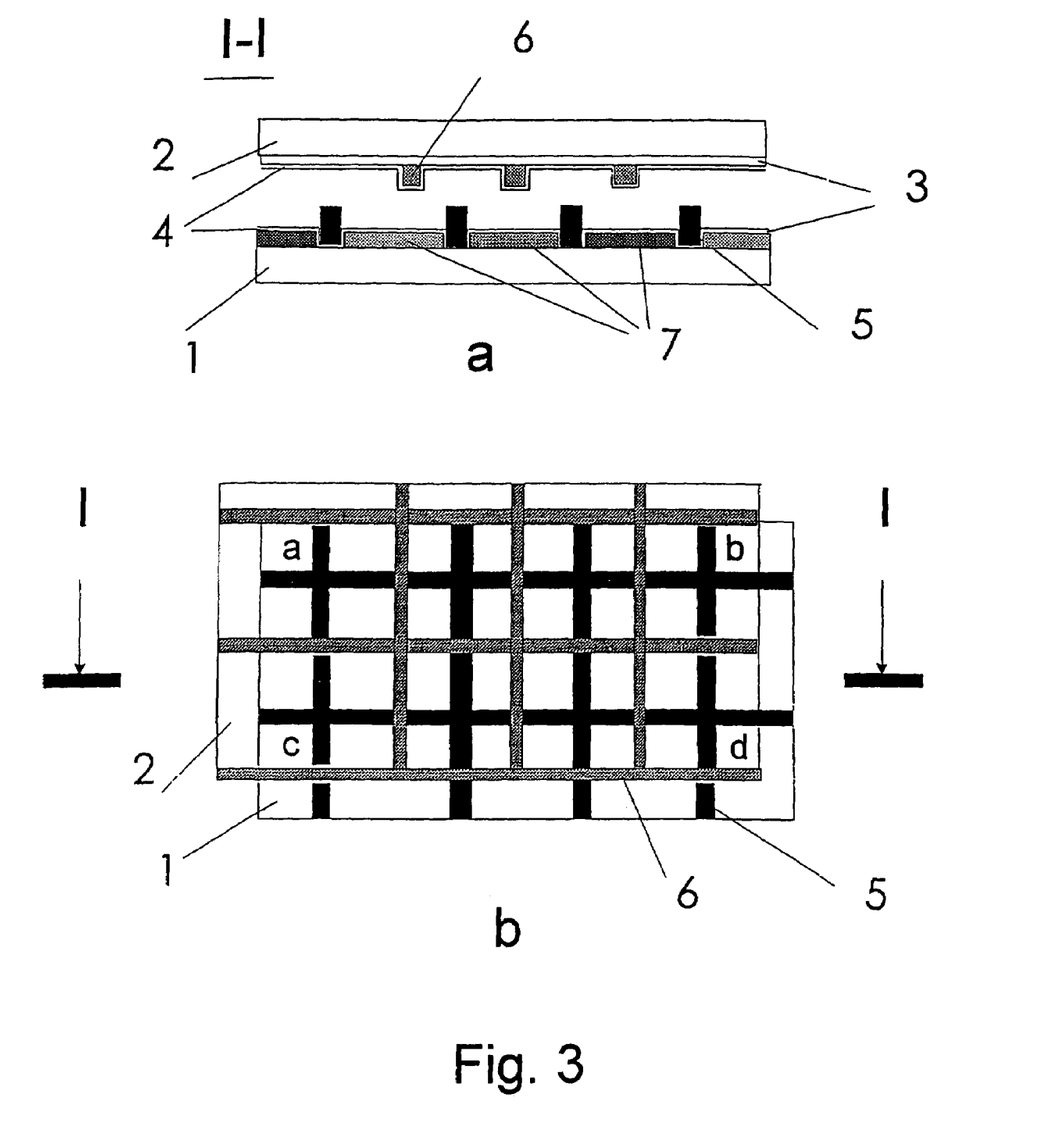
FIG. 3 shows the cross-section (a) and the top view (b) of the proposed display, fabricated according to the proposed method, in the said display the dielectric deflecting elements are displaced at the color filters substrate and play the role of the black mask.

FIG. 3 shows the cross-section (a) and the top view (b) of the proposed display, fabricated according to the proposed method, in which deflecting elements 5 at the color filters substrate are made of non-transparent dielectric material and have the form of lines 5-15 μm thick with the height 2-2.5 μm above the color filters surface. Simultaneously these deflecting elements play the role of the black matrix. Pixel abcd is surrounded by peripheral vertical lines and two horizontal lines placed at the bottom substrate 1. In other aspects the display is made similarly to that one described in FIG. 2. This display has brightness 60-80% in the on state.

Figure 4:
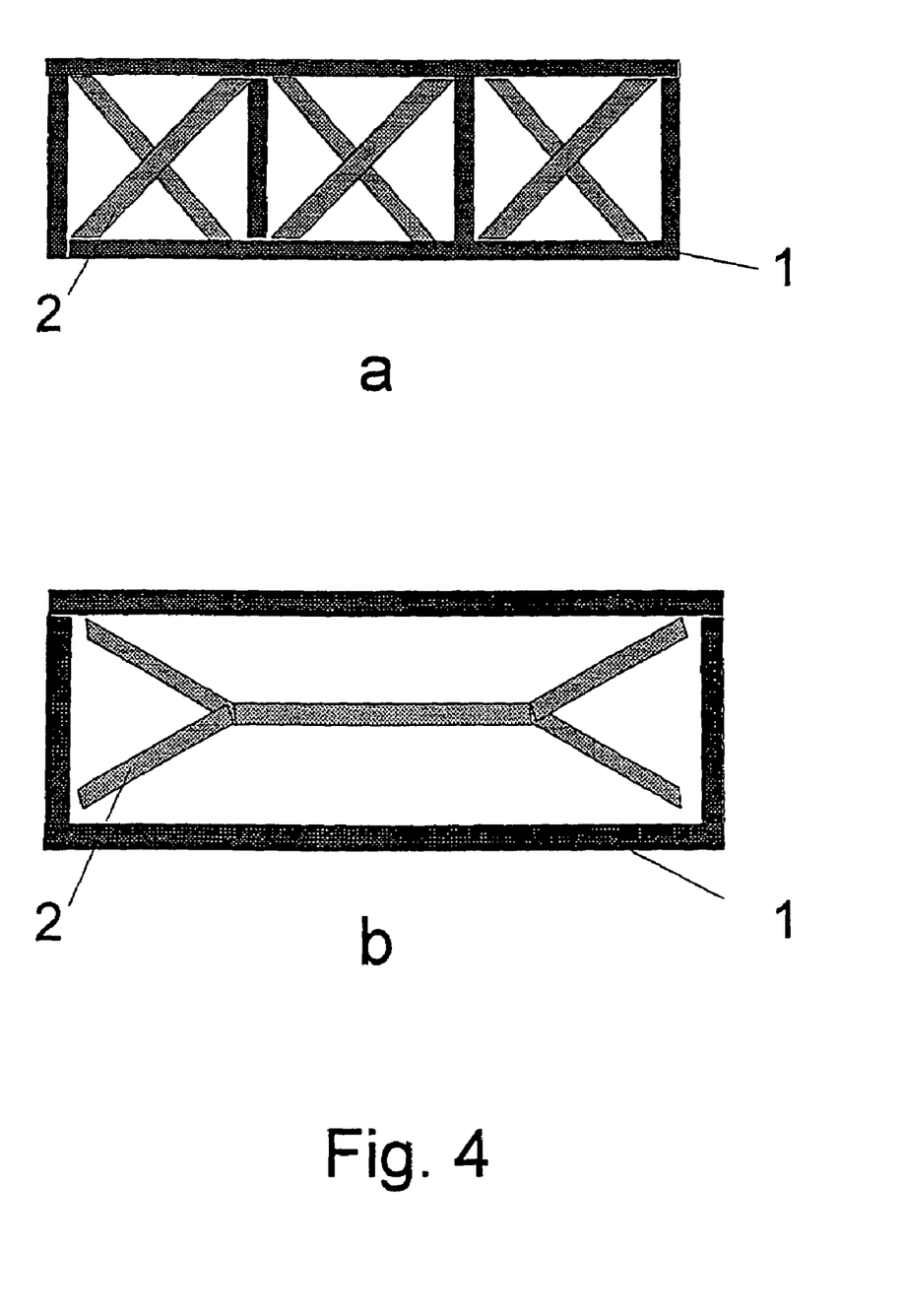
FIG. 4 shows the top view of the displays fabricated according to the proposed method with various displacement of the dielectric deflecting elements.

FIG. 4 shows the top view of the proposed displays fabricated according to the proposed method with various displacements of the deflecting dielectric elements 1 and 2 on the bottom and the top substrates respectively. Single pixel is displayed. In other aspects the display is made similarly to that one described in FIG. 2. This display has brightness 75-80% in the on state.

Figure 5:
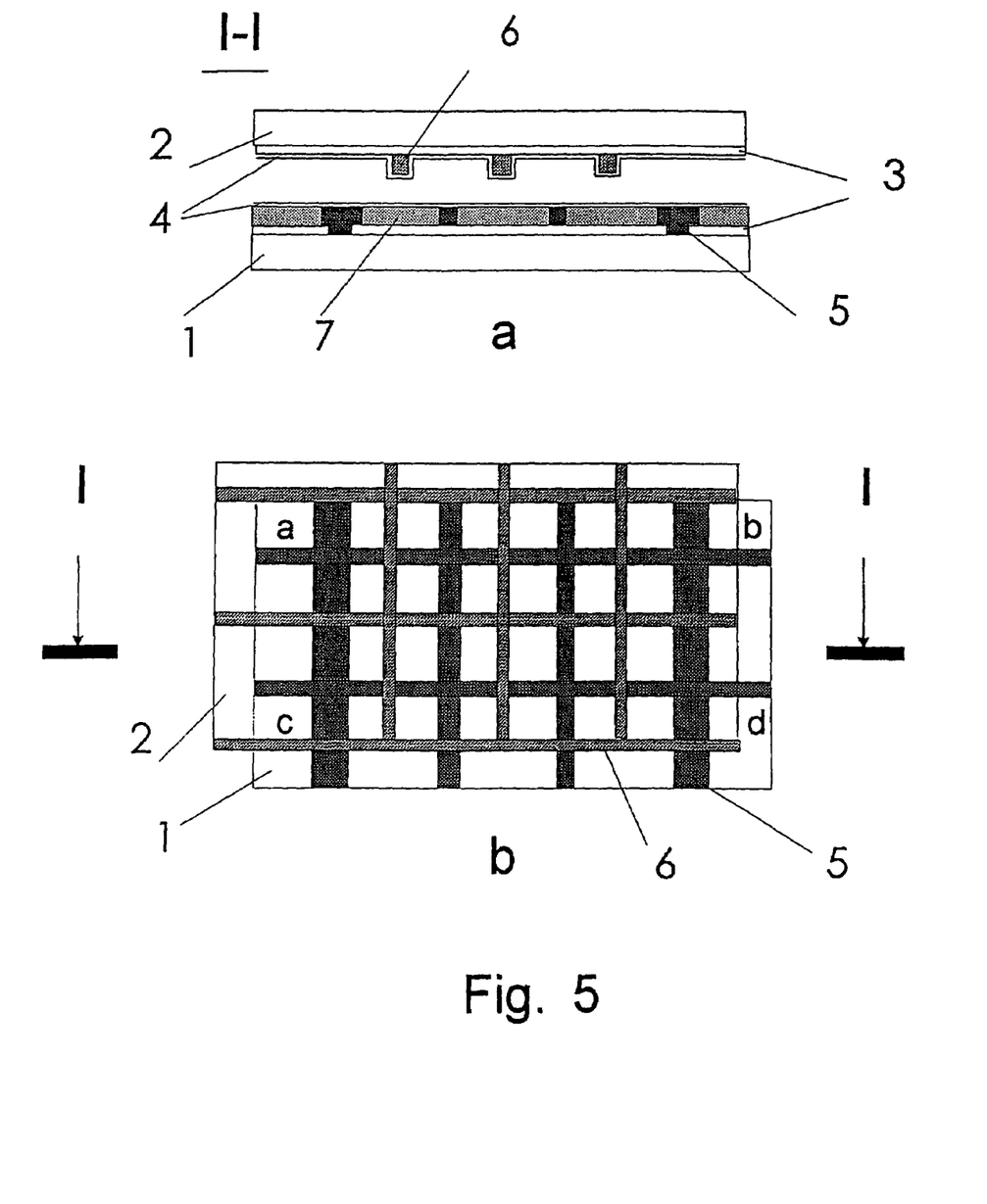
FIGS. 5-8 show the cross-section (a) and the top view (b) of the proposed display, fabricated according to the proposed method with various displacement of the dielectric deflecting elements in the cases when these elements have profiled thickness at the side of the substrate.

FIG. 5 shows the cross-section (a) and the top view (b) of the proposed display, fabricated according to the proposed method. On the bottom 1 and top 2 substrates containing the electrodes pattern 3 deflecting dielectric elements 5 and 6 are deposited. On the bottom substrate 1 the area between the dielectric deflecting elements is filled with a supplementary layer 7 possessing dielectric constant different from that of the deflecting elements (dielectric deflecting elements are profiled from the side of the substrate. On the top of all patterns on both substrates 1, 2 homeotropically aligning layer 4 is deposited. Conventional spacers, like plastic spheres 3-6 μm in diameter, are used. Pixel abcd is surrounded by thicker vertical lines and two horizontal lines placed at the bottom substrate 1. In other aspects the display is made similarly to that one described in FIG. 1. This display has brightness 75-80% in the on state.

Figure 6:
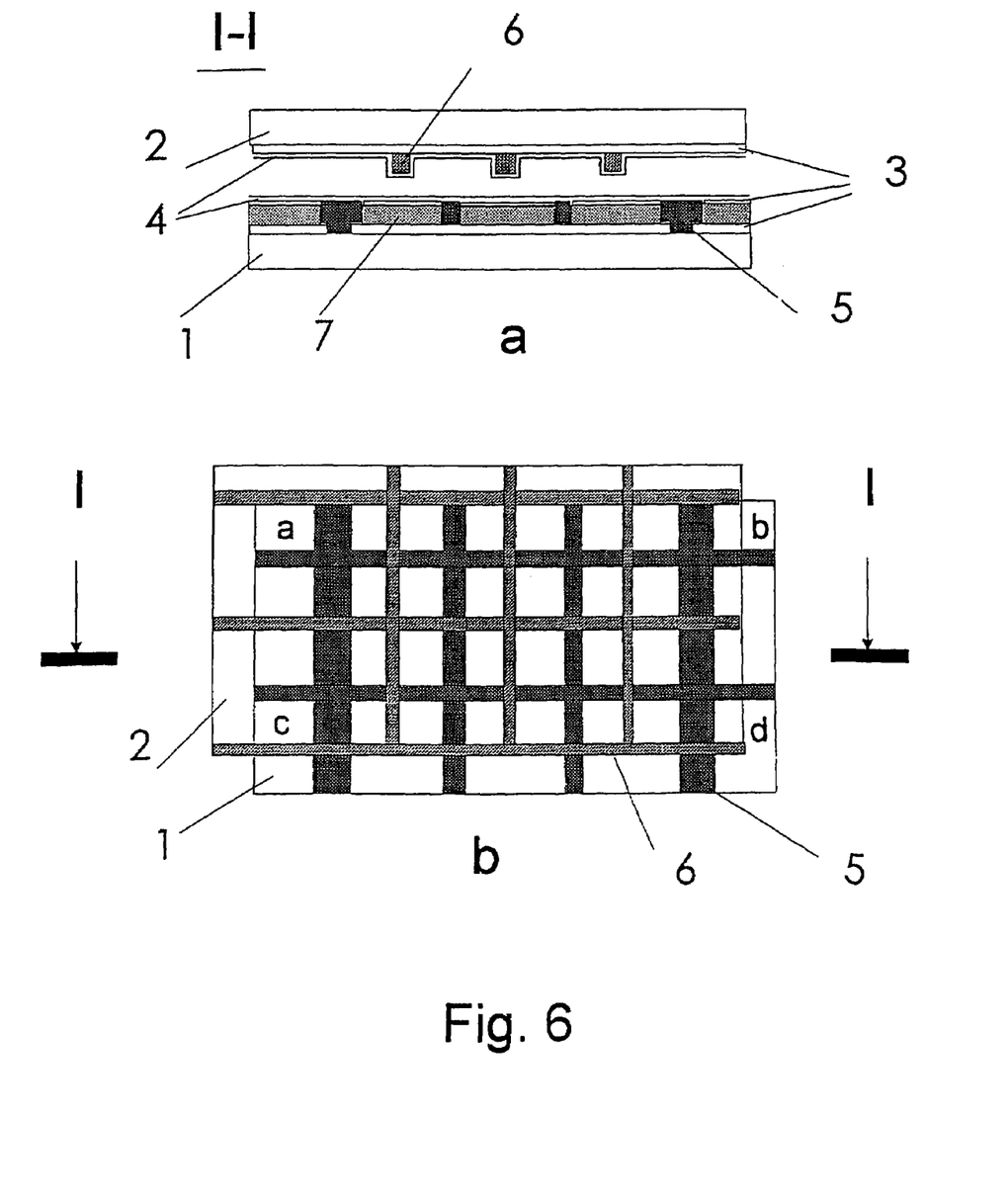

FIG. 6 shows the cross-section (a) and the top view (b) of the proposed display, fabricated according to the proposed method. On the bottom 1 and top 2 substrates containing the electrodes pattern 3 deflecting dielectric elements 5 and 6 are deposited. On the bottom substrate 1 the area between the dielectric deflecting elements is filled with a supplementary layer 7 possessing dielectric constant different from that of the deflecting elements (dielectric deflecting elements are profiled from the side of the substrate). On the top of the supplementary layer 7 conductive coating 3 is deposited. On the top of all patterns on both substrates 1, 2 homeotropically aligning layer 4 is deposited. Conventional spacers are used. Pixel abcd is surrounded by thicker vertical lines and two horizontal lines placed at the bottom substrate 1. In other aspects the display is made similarly to that one described in FIG. 1. This display has brightness 75-80% in the on state.

Figure 7:
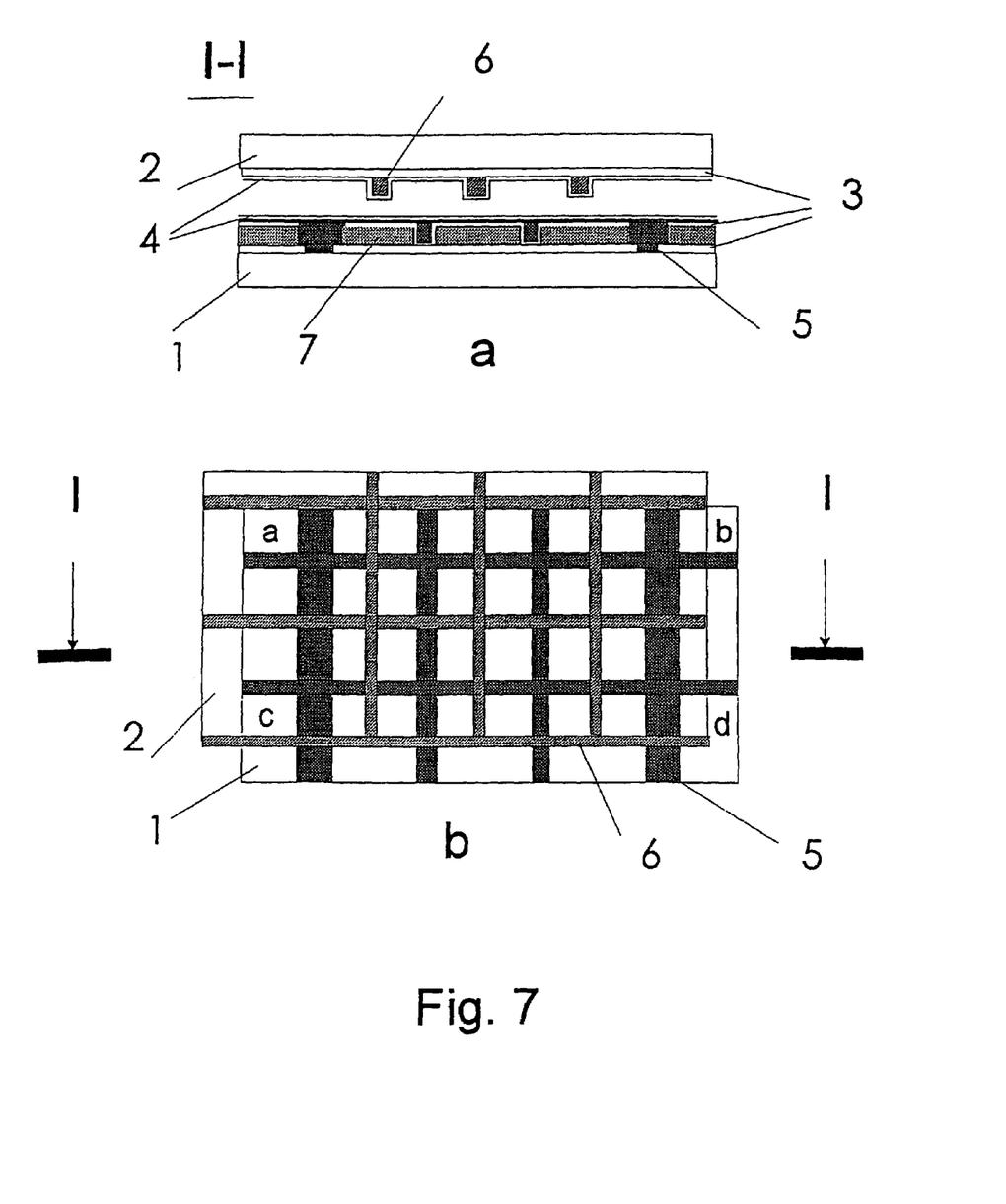

FIG. 7 shows the cross-section (a) and the top view (b) of the proposed display, fabricated according to the proposed method. On the bottom 1 and top 2 substrates containing the electrodes pattern deflecting dielectric elements 5 and 6 are deposited. On the bottom substrate 1 the area between the dielectric deflecting elements 5 is filled with a supplementary layer 7 possessing dielectric constant different from that of the deflecting elements (dielectric deflecting elements are profiled from the side of the substrate). On the top of the supplementary layer 7 conductive coating 3 is deposited. On the top of conductive coating 3 the film made of material of the deflecting dielectric element is displaced and covered with the aligning film 4. Conventional spacers are used. Pixel abcd is surrounded by thicker vertical lines and two horizontal lines placed at the bottom substrate 1. In other aspects the display is made similarly to that one described in FIG. 1. This display has brightness 75-80% in the on state.

Figure 8:
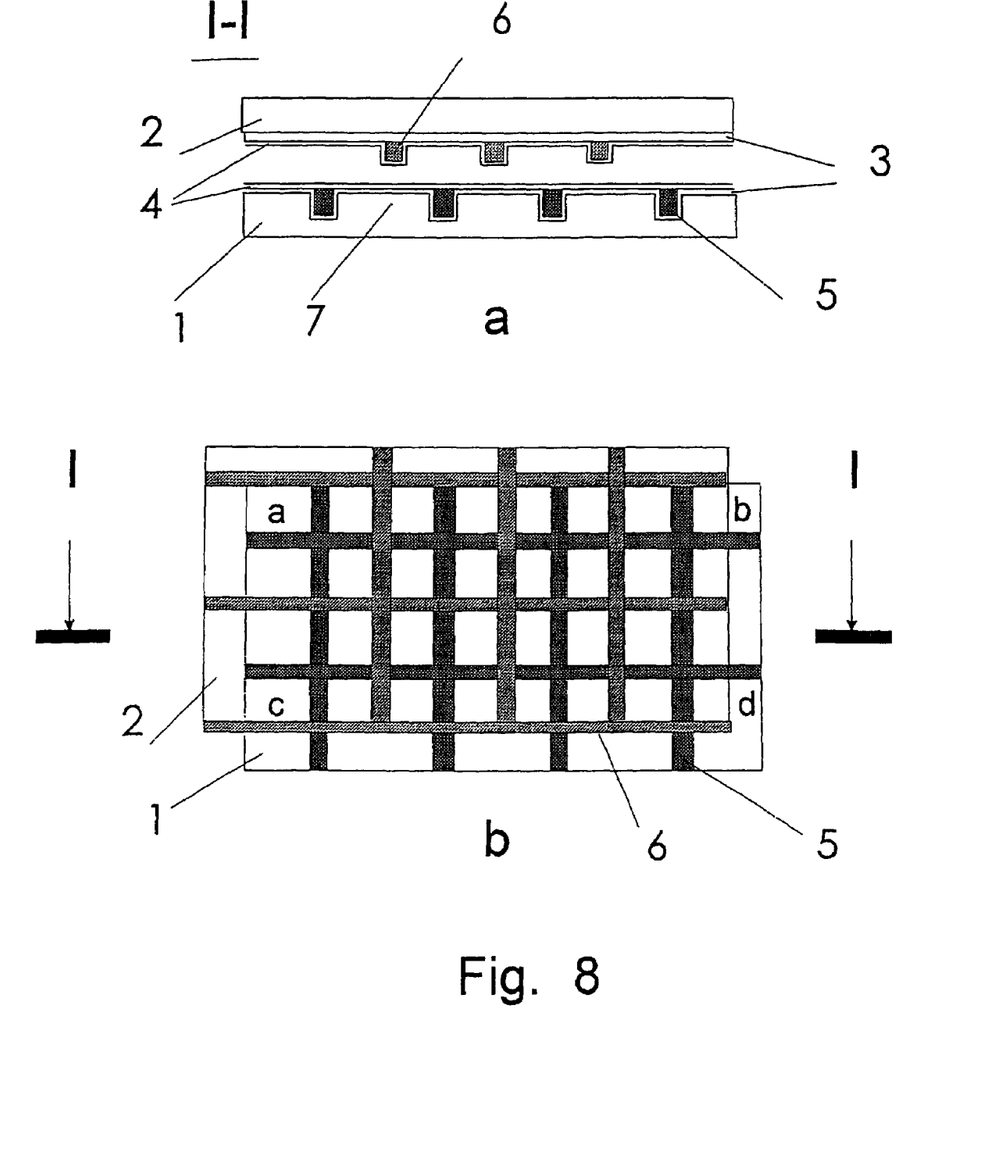

FIG. 8 shows the cross-section (a) and the top view (b) of the proposed display, fabricated according to the proposed method. On the bottom 1 and top 2 substrates containing the electrodes pattern deflecting dielectric elements 5 and 6 are deposited. On the bottom substrate 1 the area between the dielectric deflecting elements 5 is filled with a supplementary layer 7 which is made of the same material as the substrate (in a real process the grooves are made in the substrate in advance and after depositing electric conductive coating the grooves are filled with the dielectric deflecting elements 5). On the top of the supplementary layer 7 conductive coating 3 is deposited. On the top of conductive coating 3 the aligning film 4 is displaced. Conventional spacers are used. Pixel abcd is surrounded by peripheral vertical lines and two horizontal lines placed at the bottom substrate 1. In other aspects the display is made similarly to that one described in FIG. 1. This display has brightness 75-80% in the on state.

Figure 9:
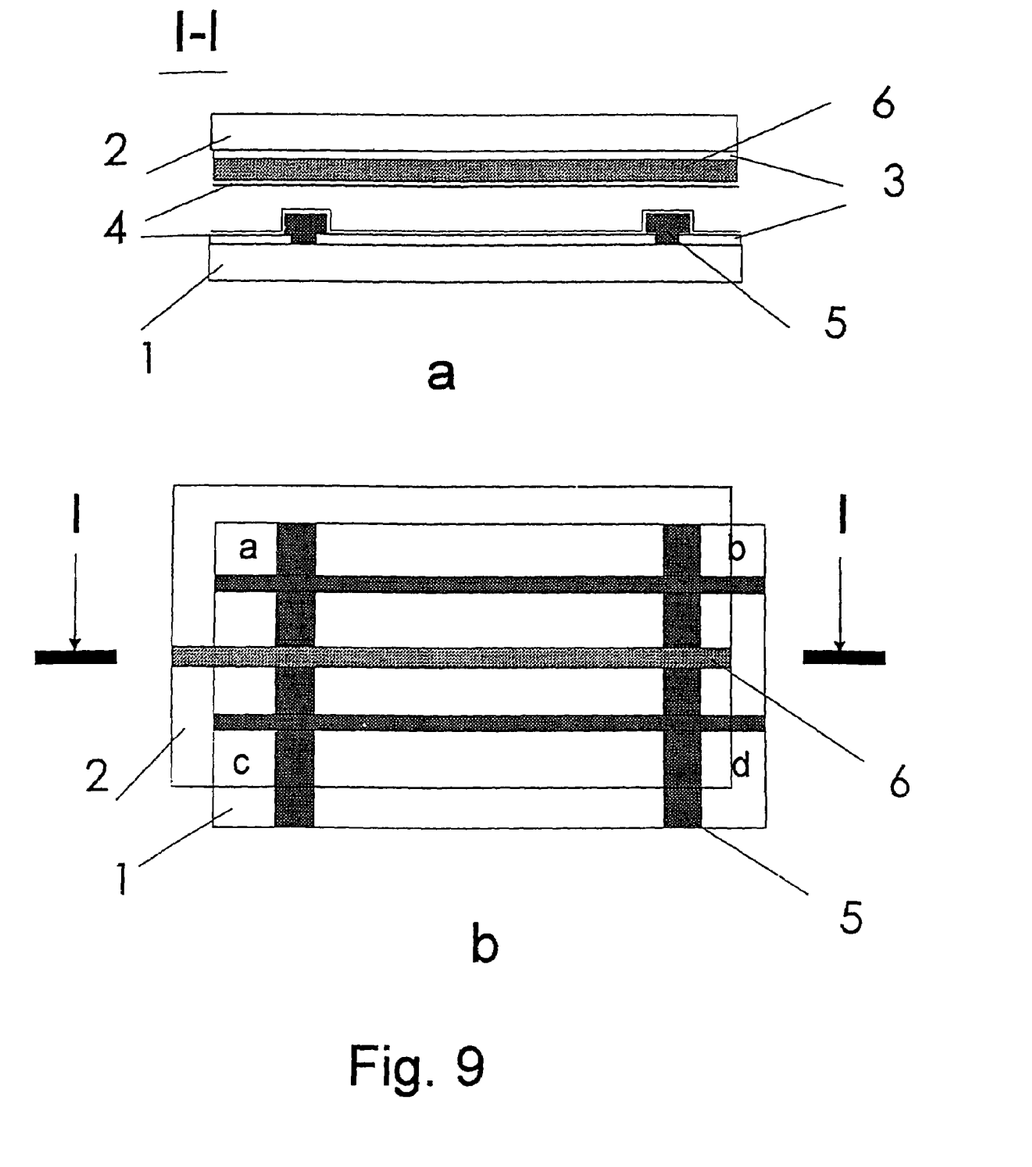
FIG. 9 shows the cross-section (a) and the top view (b) of the proposed two-domain display, fabricated according to the proposed method with planar alignment of the liquid crystal.

FIG. 9 shows the cross-section (a) and the top view (b) of the proposed display, fabricated according to the proposed method. On two plane glass substrates 1, 2 on the top of the conductive layer 3 deflecting dielectric elements 5, 6 are deposited. On one substrate, let us tell substrate 1, deflecting elements 5 have the form of crossing dielectric lines and on another substrate, for example 2, they look like dielectric lines. Lines on the both substrates 1, 2 have the width 5-6 µm, their height is 2.0-2.5 µm and the pitch –100 µm. The substrates 1, 2 are aligned so, that the lines on substrate 2 cross the sides of the rectangles formed by the lines on the substrate 1 close to their centers. The crossings of the lines on substrate 1 with the lines on the substrate 2 are used as spacers. Planar aligning layer 4, for example AL-3046 (JSR), is deposited on both substrates 1, 2. The substrates 1, 2 are rubbed parallel to each other and perpendicular to the lines on the substrate 2. The space between the substrates 1, 2 if filled with a nematic liquid crystal ZLI-3497-000 possessing positive dielectric anisotropy. Single pixel abcd is surrounded by thicker vertical lines and two horizontal lines placed at the bottom substrate 1. So made display transmits 85-90% of light in the off state in crossed polaroids.

The proposed display with homeotropic alignment of the liquid crystal possessing negative dielectric anisotropy operates as following.

In the state without electric field LC molecules are aligned orthogonal to the substrates 1, 2 in the whole area except the slopes of the deflecting dielectric elements 5, 6, in the case their profile is from the liquid crystal side. In difference to [7,8], in the proposed display the slopes of the deflecting elements are either very steep (the angle with the substrate normally is bigger than 30-40°), or they are absent at all, in the case they are profiled from the substrate side. So distortions of the liquid crystal alignment either have limited size, or absent at all and do not perturb optical parameters of the display. Therefore in the off state this display does not transmit light in the crossed polaroids.

After applying electric field liquid crystal reorients not uniformly across the pixel area, but according to the direction of the parallel to the substrates component of the electric field which appears at the LC-dielectric interface. This way domains with different (including opposite) orientation of the liquid crystal appear within the pixel area. Under various observation angles different domains have different transmittance and transmittance of the pixel as a whole equals some averaged value. Due to this, inversion of the transmission levels of LC display under various observation angles is suppressed, similarly to the effect observed in [7,8]. To increase the viewing angle (to increase the contrast under oblique observation angles) phase retarders [2] may be used in the proposed display.

Display with LC possessing positive dielectric anisotropy and aligned parallel to the substrates operates in a similar way. The difference is that in the off state this display transmits light in crossed polaroids. After applying electric field LC reorients in different directions depending on the direction of the in-plane with the substrates component of the distorted electric field, which is created at the LC-dielectric interface. As the result, viewing characteristics become similar fir different observation angles. In the on state display becomes non-transparent.

Summarizing the analysis of the proposed display and the method for its fabrication one can tell, that using conventional technology for making LC displays, in which only one technological photolithographic stage is added for making deflecting dielectric elements, it is easy to obtain display with wide viewing angle. The number of domains, their displacements, as well as proportion of their areas can be easily varied by varying photolithographically made pattern. Besides this, in transmission mode the losses of light are in the range of 10-20% in comparison with conventional single-domain displays, which are not essential for the desk-top displays.

The invention claimed is:

1. A liquid crystal display with a plurality of pixels, comprising:
    two plane substrates with electric conductive layers deposited on sides of the substrates facing each other, the electric conductive layers covered with aligning layers and liquid crystal filling the space between the substrates; and
    deflecting elements on at least one of the substrates, wherein the deflecting elements are dielectric and are over electric conductive layers along the perimeter of each pixel,
    wherein the deflecting elements on at least one substrate are arranged in lines that cross each other to define a plurality of enclosed areas within a pixel of the plurality of pixels and the deflecting elements between the adjacent electric conductive layers are wider than the deflecting elements on the conductive layers, and
    wherein the single pixel is subdivided by the deflecting elements into the plurality of enclosed areas.

2. The liquid crystal display according to claim 1, wherein the deflecting elements are made of a material with resistivity equal to or exceeding that of the liquid crystal.

3. The liquid crystal display according to claim 1, wherein the deflecting elements are additionally disposed within the area of each pixel.

4. The liquid crystal display according to claim 1, further comprising a black matrix made of the material of the deflecting elements.

5. The liquid crystal display according to claim 1, wherein the deflecting elements have a height of at least about 0.1 microns.

6. The liquid crystal display according to claim 1, wherein the deflecting elements are on both substrates over the electric conductive layers.

7. The liquid crystal display according to claim 1, wherein the deflecting elements have varying height.

8. The liquid crystal display according to claim 1, wherein the deflecting elements have a height less than or equal to the thickness of the space between the substrates.

9. The liquid crystal display according to claim 1, wherein the deflecting elements are disposed apart from one another by a gap when viewed in a direction normal to said substrates.

* * * * *